(12) United States Patent
Kelly et al.

(10) Patent No.: US 8,266,579 B2
(45) Date of Patent: Sep. 11, 2012

(54) SYSTEM AND METHOD FOR DEVELOPING AND DEPLOYING A MODEL-DRIVEN EDITOR

(75) Inventors: Kevin Edward Kelly, Raleigh, NC (US); Jan Joseph Kratky, Raleigh, NC (US); Steven Keith Speicher, Apex, NC (US); Keith Allen Wells, Angier, NC (US)

(73) Assignee: International Business Machines Corporation, Armonk, NY (US)

( * ) Notice: Subject to any disclaimer, the term of this patent is extended or adjusted under 35 U.S.C. 154(b) by 1305 days.

(21) Appl. No.: 11/250,650

(22) Filed: Oct. 14, 2005

(65) Prior Publication Data

US 2007/0089089 A1    Apr. 19, 2007

(51) Int. Cl.
G06F 9/44    (2006.01)
G06F 3/00    (2006.01)

(52) U.S. Cl. ......... 717/105; 717/109; 717/113; 715/762
(58) Field of Classification Search .................... 717/105
See application file for complete search history.

(56) References Cited

U.S. PATENT DOCUMENTS

| | | | | |
|---|---|---|---|---|
| 5,740,440 | A * | 4/1998 | West ............................. | 717/125 |
| 5,740,455 | A * | 4/1998 | Pavley et al. .................. | 715/205 |
| 5,930,512 | A * | 7/1999 | Boden et al. .................. | 717/102 |
| 6,093,215 | A * | 7/2000 | Buxton et al. ................. | 717/107 |
| 6,335,741 | B1 * | 1/2002 | Nock ............................. | 715/764 |
| 6,430,624 | B1 | 8/2002 | Jamtgaard et al. ............ | 709/246 |
| 6,539,390 | B1 | 3/2003 | Kiczales et al. ............... | 707/101 |
| 6,671,701 | B1 | 12/2003 | Chouinard .................... | 707/201 |
| 6,684,369 | B1 * | 1/2004 | Bernardo et al. ............. | 715/205 |
| 6,704,755 | B2 | 3/2004 | Midgley et al. ............... | 707/204 |
| 6,754,885 | B1 * | 6/2004 | Dardinski et al. ............ | 717/113 |
| 6,785,880 | B1 * | 8/2004 | Beisiegel et al. ............. | 717/106 |
| 6,925,632 | B2 * | 8/2005 | Shiu .............................. | 717/121 |
| 6,996,781 | B1 * | 2/2006 | Myers et al. .................. | 715/763 |

(Continued)

FOREIGN PATENT DOCUMENTS

EP    0982670 A2    3/2000

OTHER PUBLICATIONS

Steve Brody, "Interview: The Eclipse code donation", Nov. 1, 2002, retrieved from <http://www.ibm.com/developerworks/linux/library/I-erick.html>, pp. 1-3.*

(Continued)

*Primary Examiner* — Don Wong
*Assistant Examiner* — Marina Lee
(74) *Attorney, Agent, or Firm* — VanLeeuwen & VanLeeuwen

(57) ABSTRACT

A system and method for developing software using dynamic dual-mode model and data entry is presented. During development, a model developer uses a model window and an editor window to create a model-driven editor. The model window displays model data, and the editor window displays instances of the model data, which results in the model-driven editor. When the developer is ready to deploy the model-driven editor, the model developer simply inhibits the model window. Therefore, the models are not compiled during deployment and, in turn, the model developer does not need to test compiled code. Since the model-driven editor relies upon self-contained models, the models may be updated, added, or removed locally or remotely on an individual basis. In one embodiment, the end user is able to re-enable the model window in order to view model data.

17 Claims, 8 Drawing Sheets

U.S. PATENT DOCUMENTS

| | | | |
|---|---|---|---|
| 7,076,766 B2* | 7/2006 | Wirts et al. | 717/121 |
| 7,080,353 B2* | 7/2006 | Rosenberg et al. | 717/108 |
| 7,272,819 B2* | 9/2007 | Seto et al. | 717/109 |
| 7,398,268 B2* | 7/2008 | Kim et al. | 707/3 |
| 7,493,594 B2* | 2/2009 | Shenfield et al. | 717/107 |
| 7,757,209 B2* | 7/2010 | Fukui | 717/113 |
| 7,814,427 B2* | 10/2010 | Cook et al. | 715/763 |
| 2002/0052941 A1 | 5/2002 | Patterson | 709/223 |
| 2003/0014442 A1* | 1/2003 | Shiigi et al. | 707/513 |
| 2003/0237046 A1* | 12/2003 | Parker et al. | 715/513 |
| 2004/0015858 A1* | 1/2004 | Seto et al. | 717/120 |
| 2004/0143583 A1* | 7/2004 | Poole et al. | 707/100 |
| 2004/0220684 A1* | 11/2004 | Fukui | 700/18 |
| 2005/0268233 A1* | 12/2005 | Perla et al. | 715/703 |
| 2005/0273763 A1* | 12/2005 | Bendsen et al. | 717/120 |
| 2006/0195817 A1* | 8/2006 | Moon | 717/104 |
| 2006/0206890 A1* | 9/2006 | Shenfield et al. | 717/174 |
| 2007/0027935 A1 | 2/2007 | Haselton et al. | 707/204 |
| 2007/0027936 A1 | 2/2007 | Stakutis et al. | 707/204 |
| 2007/0089089 A1* | 4/2007 | Kelly et al. | 717/110 |

OTHER PUBLICATIONS

"Eclipse Platform Technical Overview", Feb. 19, 2003, Object Technical Internationa, Inc., retrieved from <http://www.eclipse.org/whitepapers/eclipse-overview.pdf> , pp. 1-20.*

Kelly et al., "Model-driven compound document development", Jul. 22, 2005, retrieved from <http://www.ibm.com/developerworks/library/x-mdcdd/> pp. 1-12.*

Catherine Griffin,"Using EMF", 2002, IBM, retrieved from <http://www.eclipse.org/articles/Article-Using%20EMF/using-emf.html>, total pp. 8.*

Ed Merks, "The Eclipse Modeling Framework", retrieved from <http://www.eclipse.org/modeling/emf/docs/presentations/JavaOne/JavaOnePresentation.pdf>, total pp. 37.*

R. Ian Bull, "Integrating Dynamic Views Using Model Driven Development", 2006, retrieved from <http://webhome.cs.uvic.ca/~chisel/pubs/irbull_cascon06.pdf> total pp. 13.*

* cited by examiner

SYSTEM AND METHOD FOR DEVELOPING AND DEPLOYING A MODEL-DRIVEN EDITOR

BACKGROUND OF THE INVENTION

1. Technical Field

The present invention relates to a system and method for developing software using dynamic dual-mode model and data entry. More particularly, the present invention relates to a system and method for using a modeling framework to seamlessly develop and deploy a model-driven editor.

2. Description of the Related Art

Model-driven architectures and applications are becoming more and more popular. In order to create the architectures and applications, an end user may use a model-driven "editor." A model-driven editor uses a framework, such as the Eclipse Modeling Framework, and instance data that is produced by models.

A model-driven editor typically passes through two phases before being released to an end user. The first phase is a development phase. During the development phase, a developer creates and refines models on an iterative basis, such as examining the models' instance data and adjusting the models accordingly. A challenge found, however, is that existing modeling frameworks do not include persistence mechanisms to support this iterative process. For example, existing art has little ability to dynamically reflect instance data changes resulting from changes to the underlying models. Furthermore, the existing editors do not provide a standard method for accessing the models that generate the editors. Therefore, a developer has difficulty when analyzing instance data changes that result from model data changes, additions, or deletions.

Once the developer is finished with the development phase, the developer deploys the model-driven editor to an end user. The end user, however, is typically not interested in the means by which the editor was developed (e.g., models), but rather the finished product (e.g., instance data). A challenge found is that existing art does not provide phase transition mechanisms to easily transition from the development phase to the deployment phase. For example, existing art typically requires code compilation of some sort and, therefore the developer must test and verify the compiled code before deploying the editor.

In addition, a growing trend in software development is the use of "mixed-content" or "compound" documents. These documents include a combination of specific namespace vocabularies, such as XHTML, XForms, and MathML. A challenge found is that constructing editors to support mixed-content documents are becoming increasingly complex. However, using modeling principles to construct the editors eases the development complexity. For example, the Eclipse Modeling Framework (EMF) allows dynamic model and instance editing. A challenge found, however is that existing art has difficulty supporting mixed-content documents in a dynamic manner, particularly when a namespace vocabulary is added or removed.

What is needed, therefore, is a system and method that provides persistence mechanisms during model-driven editor development as well as phase transition mechanisms for model-driven editor deployment.

SUMMARY

It has been discovered that the aforementioned challenges are resolved using a system and method for simultaneously displaying model data and instance data during model-driven development, and inhibiting model data viewing in order to deploy the model-driven editor. During development, a model developer uses a model window and an editor window to create a model-driven editor. The model window displays model data, and the editor window displays instances of the model data, which results in the model-driven editor. When the developer is ready to deploy the model-driven editor, the model developer simply inhibits the model window. Therefore, the models are not compiled during deployment and, in turn, the model developer is not required to test compiled code.

A model developer begins development by invoking a framework. The framework provides a development environment for the model developer to generate models that produces the model-driven editor. The framework may be a common framework known to those skilled in the art, such as the Eclipse Modeling Framework (EMF).

The framework includes a development platform, which may be a development editor included in the framework.

During development, the model developer creates models using a model window, which are stored in a model storage area. In turn, instance data corresponding to the models are displayed on an editor window, which is essentially the model-driven editor under development. In one embodiment, model data and instance data may be displayed, but separated, on the same "window" or "panel."

The model developer uses the model window to modify, add, and delete models during the development phase. Once the model developer is ready to deploy the model-driven editor, the model developer inhibits the model window from viewing, which prevents the end user from viewing model data. The model developer then deploys the model-driven editor to the end user.

The end user uses the editor window as an editing environment. In particular, the end user may use the editor window to produce a compound document. As those skilled in the art can appreciate, a compound document is a document that includes heterogeneous content, with respective content types represented by a model. In one embodiment, the end user may use the editor window as a test environment to edit/create models, or to test cross-model relationships.

Since the editor window relies upon self-contained models that are included in the models storage area, the models may be updated, added, or removed locally or remotely on an individual basis. In one embodiment, the end user is able to re-enable the model window in order to view model data. In this embodiment, the system may authenticate the user before allowing the user to view model data on the model window.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
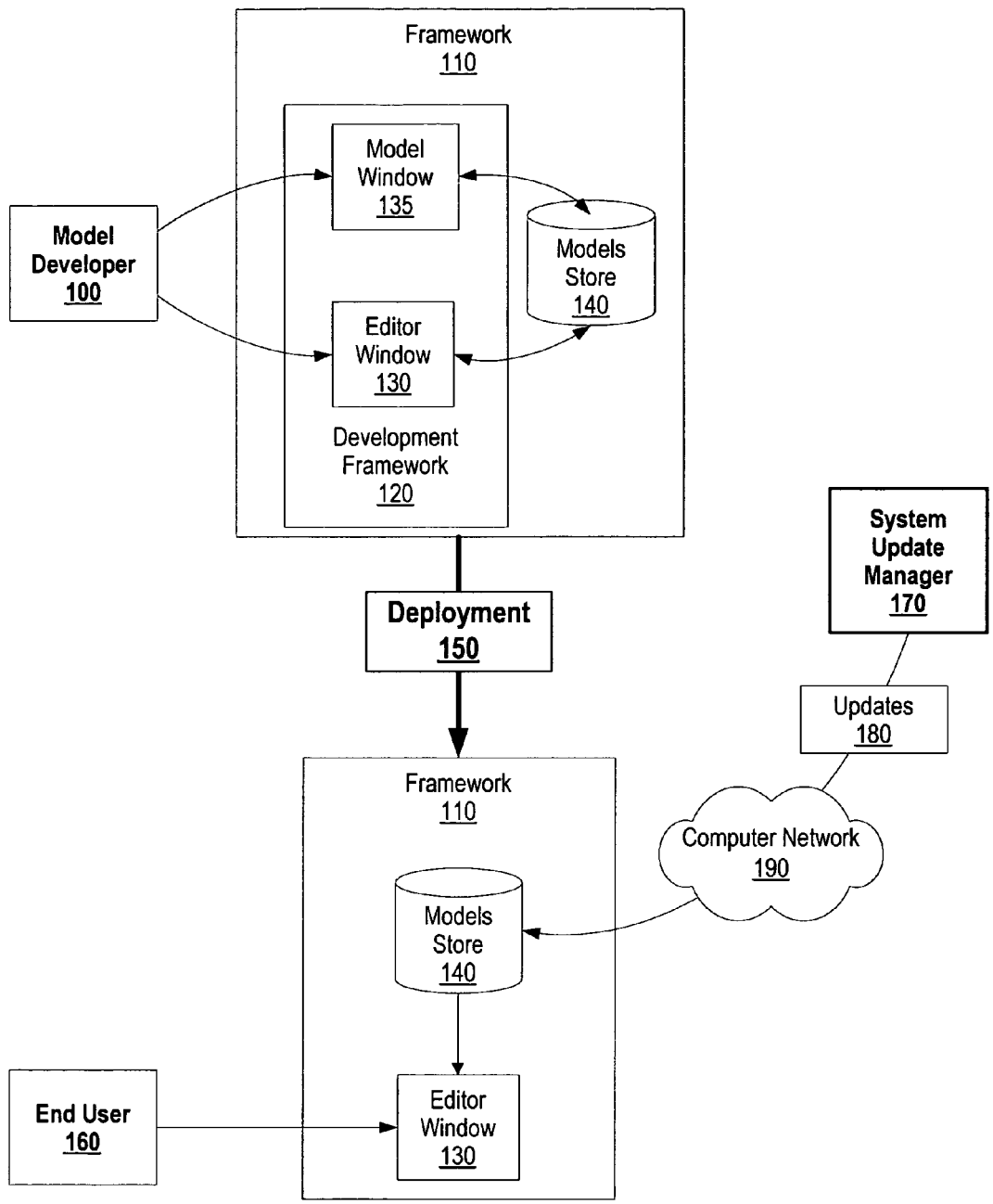
FIG. 1 is a diagram showing a model developer developing and deploying an editor to an end user.

FIG. 1 is a diagram showing a model developer developing and deploying an editor to an end user. During development, model developer 100 uses model window 135 and editor window 130 to create a model-driven editor. Model window 135 displays model data, and editor window 130 displays instances of the model data, which results in the model-driven editor.

Model developer 100 begins development by invoking framework 110. Framework 110 provides a development environment to model developer 100 in order for model developer 100 to generate models that produce the model-driven editor. Framework 110 may be a common framework known to those skilled in the art, such as the Eclipse Modeling Framework (EMF).

Framework 110 includes development framework 120, which may be a development editor included in framework 110. During development, model developer 100 creates models using model window 135, and stores the models in models store 140. In turn, instance data produced by the models are displayed on editor window 130, which is the model-driven editor under development. Models store 140 may be stored on a nonvolatile storage area, such as a computer hard drive.

Figure 2:
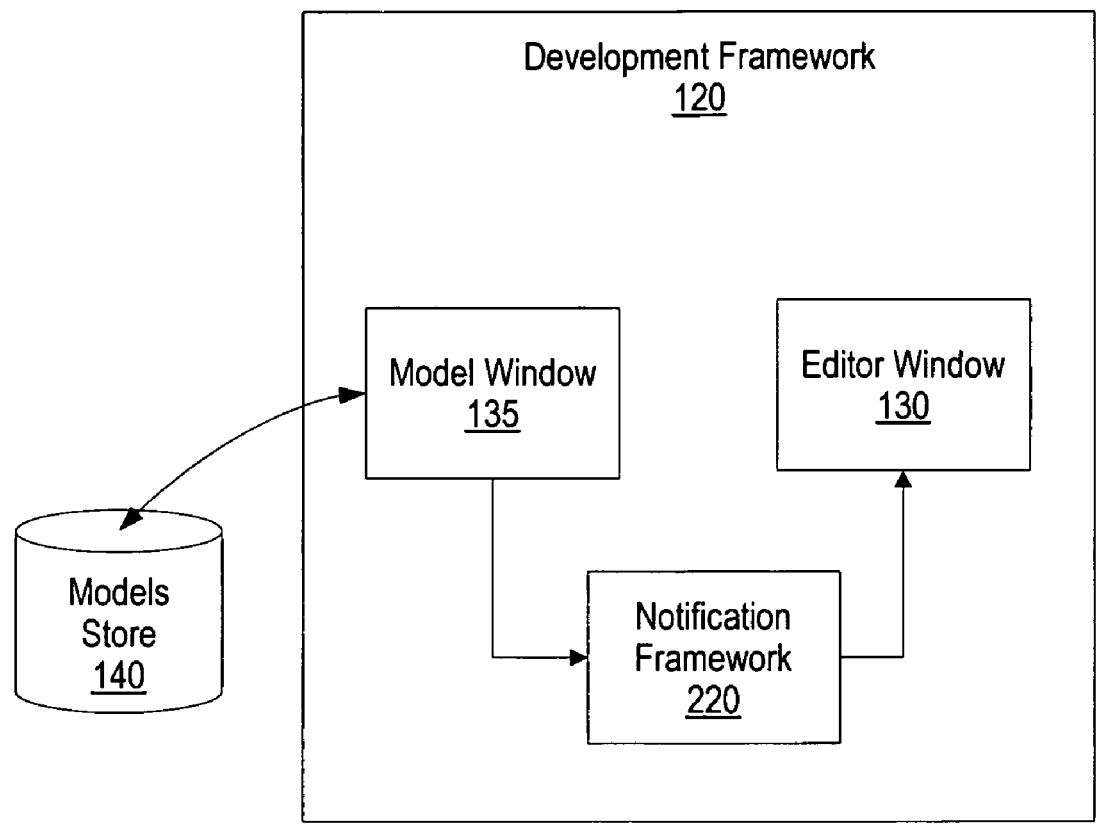
FIG. 2 is a diagram showing a development framework displaying a model window and an editor window for a developer to view during model-driven editor development.

Model developer 100 uses model window 135 to modify, add, and delete models during the development phase (see FIG. 2 and corresponding text for further details regarding model window properties). Once model developer 100 is ready to deploy editor 130, model developer 100 prepares editor 130 for deployment by inhibiting model window 135 from viewing, which prevents end user 160 from viewing model data. Model developer 100 then deploys (deployment 150) the model-driven editor to end user 160. The deployed model-driven editor includes the models in models store 140, which produces the model-driven editor that is displayed on editor window 130.

End user 160 uses editor window 130 as an editing environment. In particular, end user 160 may use editor window 130 to produce a compound document. As those skilled in the art can appreciate, a compound document is a document that includes heterogeneous content, with respective content types represented by a model. In one embodiment, end user 160 may employ editor window 130 as a test environment to edit/create models, or to test cross-model relationships.

Since editor window 130 relies upon self-contained models that are included in models store 140, an update manager, such as system update manager 170, may update models individually as required. FIG. 1 shows that system update manager 170 provides updates 180 to models store 140 through computer network 190, such as the Internet. Updates 180 may include one or more model updates that overwrite one or more models that are currently included in models store 140.

In addition, other changes to the content of models store 140 are possible, such as removing or adding models. Removing a model makes the model unavailable, and adding a model creates an entirely new set of functionality available to the editor. For example, in compound document editing, adding a new model may signal an entirely new capability within the editor, such as the ability to generate an entirely new type of image. Or, adding a new model may provide a new class of instance data that is a new "unit" in a set of "units" that comprise an editable compound document (see FIG. 3B and corresponding text for further details regarding model updating).

In one embodiment, end user 160 is able to re-enable model window 135 in order to view the model data. In this embodiment, end user 160 may be required to provide a password in order to view model window 135 and view the model data (see FIG. 4B and corresponding text for further details).

FIG. 2 is a diagram showing a development framework displaying a model window and an editor window for a developer to view during model-driven editor development. Development framework 120 is the same as that shown in FIG. 1, which a developer uses during the development phase of a model-driven editor.

Development framework 120 includes model window 135, editor window 130, and notification framework 220. Model window 135 displays model data based upon models that are included in models store 140. A developer uses model window 135 to add, change, or delete model information during development. Notification framework 220 detects changes to the model data, and generates corresponding changed instance data that is displayed on editor window 130. Model window 135, editor window 130, and models store 140 are the same as that shown in FIG. 1.

The developer makes changes to model data on model window 135, and views the results to the changes in editor window 130. When the developer is satisfied with the model-driven editor that is displayed in editor window 130, the developer inhibits model window 135 and deploys the model-driven editor to an end user (see FIGS. 4-6 and corresponding text for further details regarding model-driven editor deployment).

Figure 3A:
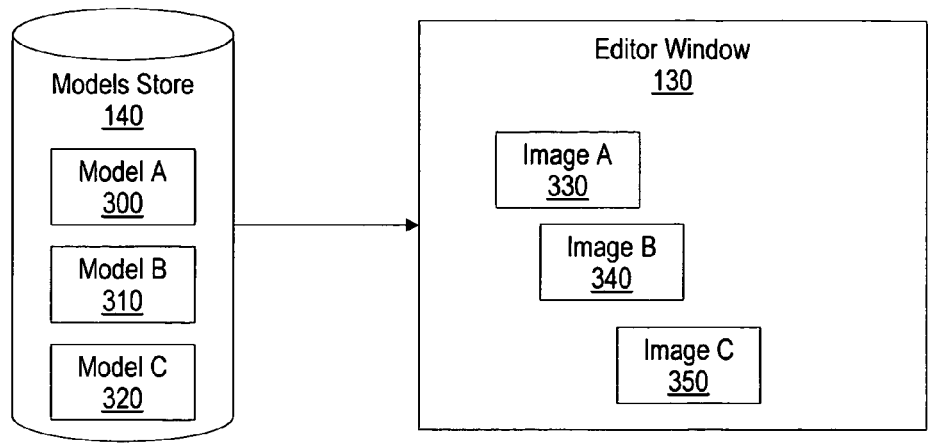
FIG. 3A is a diagram showing models driving an end-user's editor window.

FIG. 3A is a diagram showing models driving an end-user's editor window. Editor window 130 displays a model-driven editor that was developed by a model developer. Editor window 130 is the same as that shown in FIG. 1, and uses a framework, such as the Eclipse Modeling Framework, as a means to display instance data that is based upon models.

FIG. 3A shows model A 300, model B 310, and model C 320 located in models store 140, whose corresponding instance data are image A 330, image B 340, and image C 350, respectively, that are displayed on editor window 130. Models store 140 is the same as that shown in FIG. 1. Since editor window 130 is a model-driven editor, the models included in models store 140 are not compiled and, therefore, may be updated on an individual basis (see FIG. 3B and corresponding text for further details regarding model updating).

Figure 3B:
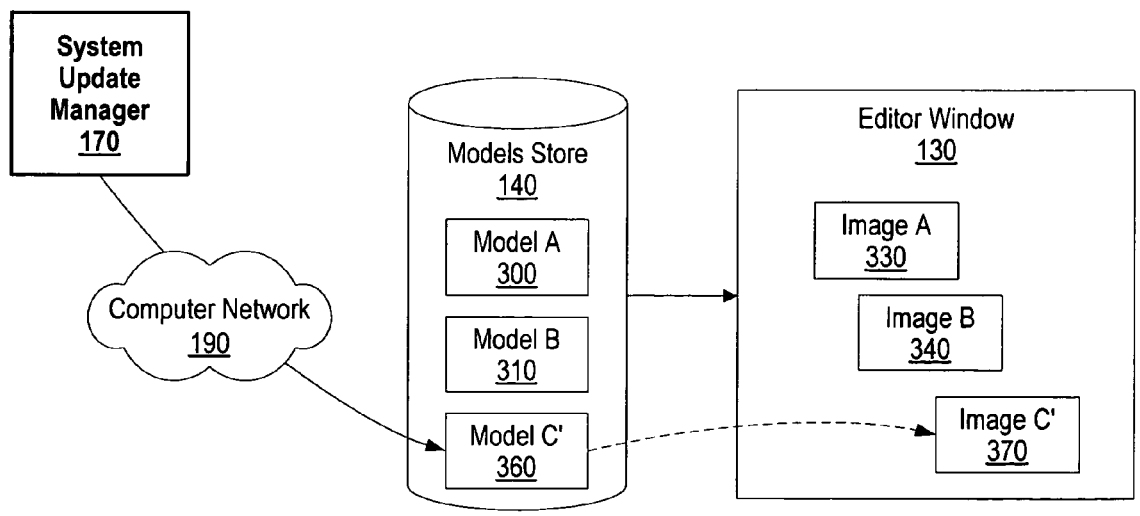
FIG. 3B is a diagram showing a deployed model-driven editor receiving updated models from a remote system.

FIG. 3B is a diagram showing a deployed model-driven editor receiving updated models from a remote system. An end user views image A 330 and image B 340 using editor window 130. Image A 330 and image B 340 are instance data corresponding to model A 300 and model B 310 that are located in models store 140. Model A 300, model B 310, image A 330, and image B 340 are the same as that shown in FIG. 3A. Models store 140 and editor 130 are the same as that shown in FIG. 1.

Since, in a model-driven editor, the models are not compiled, system update manager 170 may individually update particular models in models store 140 through computer network 190 (e.g., the Internet). Comparing FIG. 3B to FIG. 3A, system update manager 170 updates model C 320 (FIG. 3A) with model C' 360. As such, editor window 130 displays image C' 370 in FIG. 3B, which is instance data that corresponds to model C' 360. In one embodiment, an end user may also update models locally, such as with a compact disc.

Figure 4A:
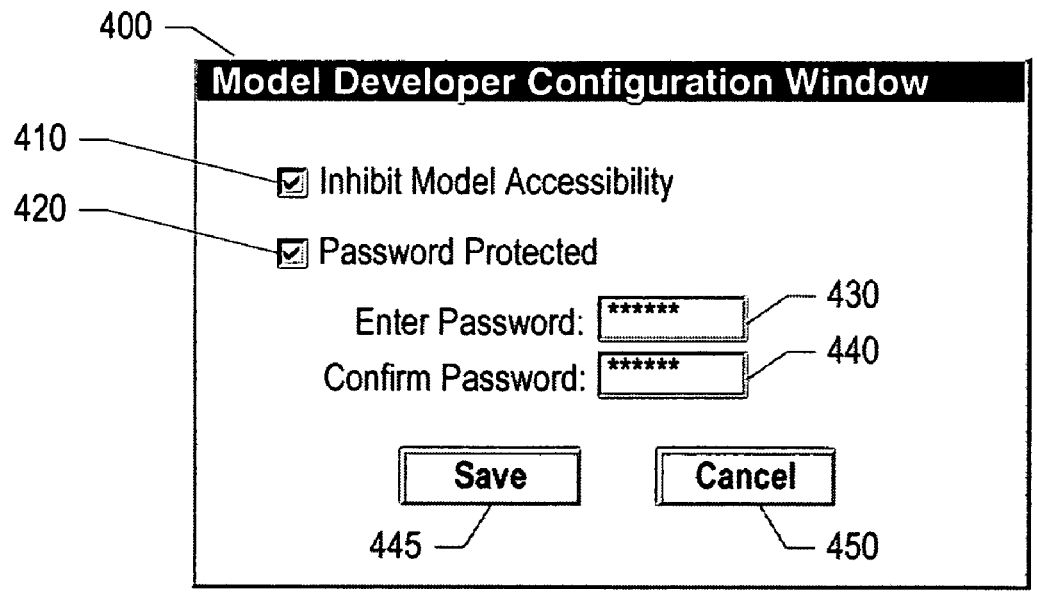
FIG. 4A is a developer interface window that allows a developer to disable views to models that drive an editor.

FIG. 4A is a developer interface window that allows a developer to disable views to models that drive an editor. A system displays window 400 to a model developer when the model developer wishes to view model data on a model window. In addition, window 400 allows the model developer to inhibit model accessibility when the model developer deploys the models as part of a model-driven editor package.

The model developer selects box 410 when the model developer wishes to inhibit displaying a model window that includes model data, such as model window 135 shown in FIG. 2. The model developer also selects box 410 to deploy the model-driven editor (see FIG. 5 and corresponding text for further details regarding model-driven editor deployment).

In turn, the model developer may select box 420 in order to require an end user to enter a password in order to re-enable the model window. When the model developer selects box 420, the model developer enters a password in text boxes 430 and 440. In order to save the model developer's changes, the model developer selects command button 445. The model developer selects command button 450 in order to cancel the changes and close window 400.

Figure 4B:
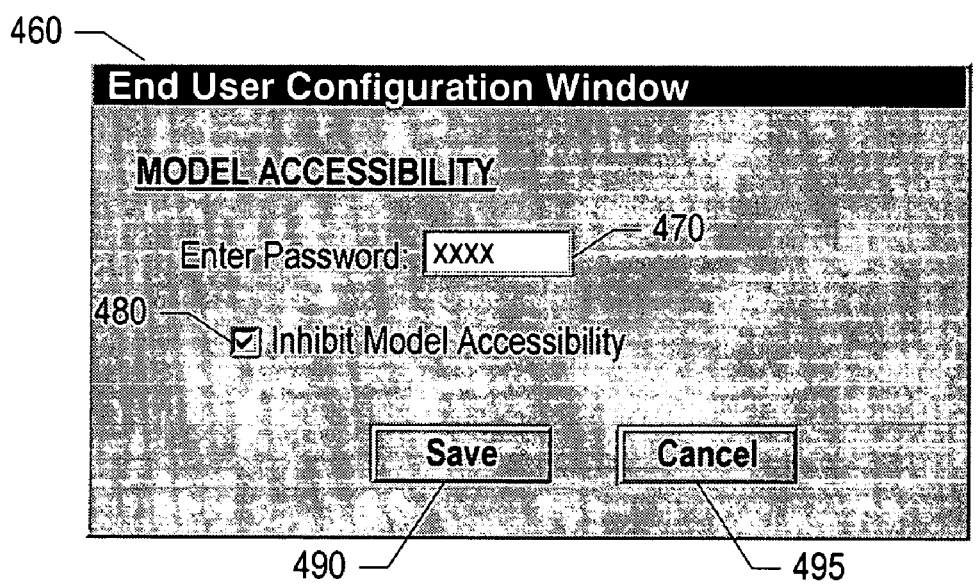
FIG. 4B is an end user interface window that allows an end user to enable viewing access to models that drive an editor.

FIG. 4B is an end user interface window that allows an end user to enable viewing access to models that drive an editor. When a model developer deploys a model-driven editor, the model developer inhibits an end user from model accessibility (discussed in FIG. 4A above). In one embodiment, the end user may have the option of viewing model data in a model window. In this embodiment, the model-driven editor may display window 460 when prompted.

The end user enters a password in text box 470 in order for the model-driven editor to authorize the end user. The password may be a default password that the model developer sets, such as "1234," or the password may be a complex password that the end user must request from the model developer. In one embodiment, the system authenticates the user by other means, such as matching the user's identifier against a set of permissions.

Once the end user enters the appropriate password into text box 470, the end user de-selects box 480 in order to view model data on a model window. To save the end user's changes, the end user selects command button 490. The end user selects command button 495 in order to cancel the changes and close window 460.

Figure 5:
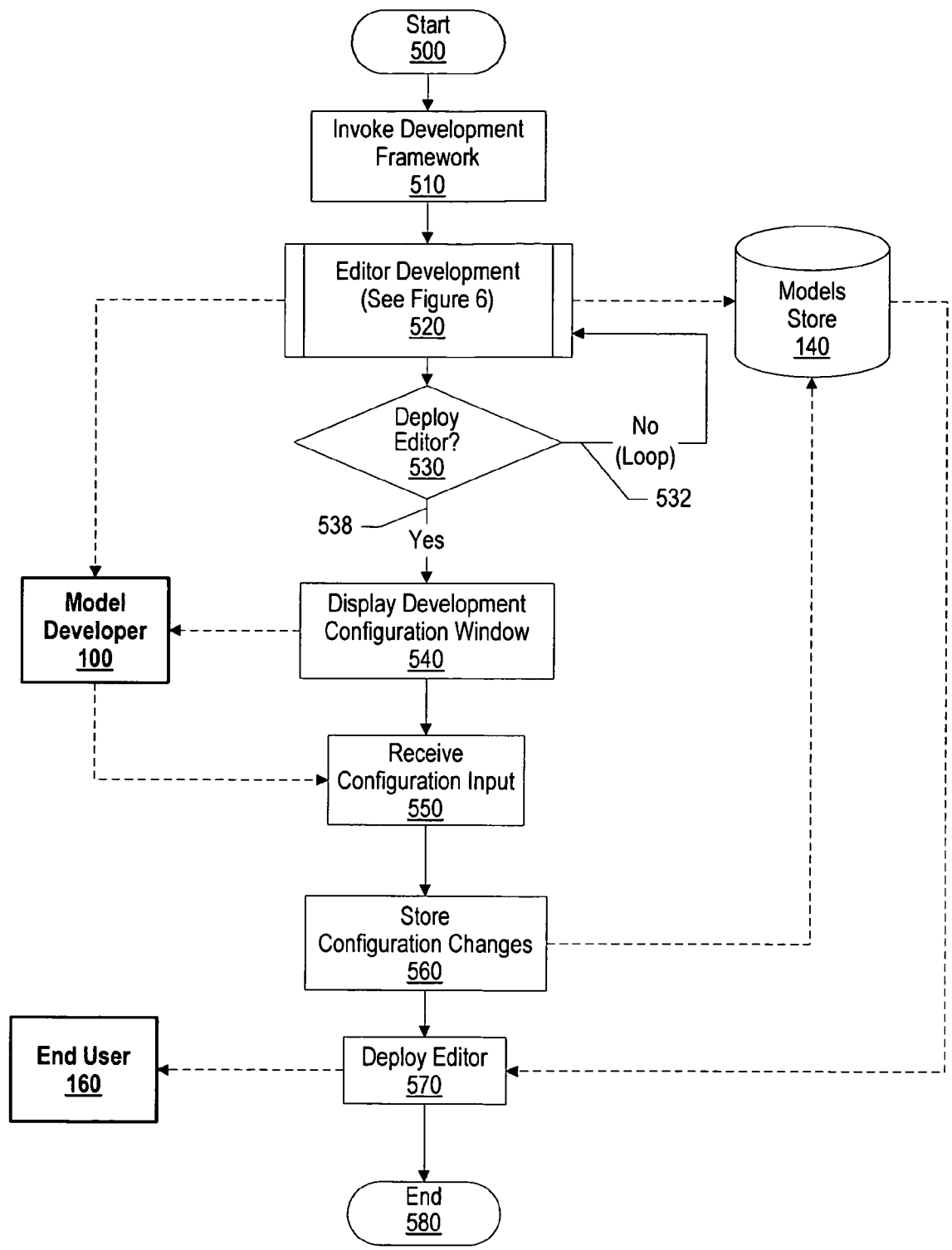
FIG. 5 is a flowchart showing steps taken in developing and deploying a model-drivel editor.

FIG. 5 is a flowchart showing steps taken in developing and deploying a model-drivel editor. A developer uses a framework (e.g., Eclipse) to create a model-driven editor by generating models whose instance data produce the model-driven editor. Once the developer is finished developing the model-driven editor, the developer deploys the models and framework to an end user.

Processing commences at 500, whereupon processing invokes a development framework at step 510. Once invoked, model developer 100 uses the development framework to generate and store models in models store 140 (pre-defined process block 520, see FIG. 6 and corresponding text for further details). Model developer 100 and models store 140 are the same as that shown in FIG. 1.

A determination is made as to whether model developer 100 is ready to deploy the model-driven editor that is produced by the models that are stored in models store 140 (decision 530). If model developer 100 is not ready to deploy the model-driven editor, decision 530 branches to "No" branch 532, which loops back to allow model developer 100 to continue to develop the model-driven editor. This looping continues until model developer 100 wishes to deploy the model-driven editor, at which point decision 530 branches to "Yes" branch 538.

At step 540, processing displays a development configuration window. The development configuration window allows model developer 100 the ability to disable an end user from viewing model data on a model window (see FIG. 3A and corresponding text for further details regarding development configuration window properties). Processing receives model developer 100's input at step 550, which may include a password that an end user must enter to re-enable the model window. In one embodiment, model data and instance data may be displayed, but separated, on the same "window" or "panel." In this embodiment, processing disables viewing model data on the particular window or panel.

Processing stores model developer 100's configuration changes in models store 140 at step 560. At step 570, processing deploys the model-driven editor to end user 160. The deployed model-driven editor includes the models created by model developer 100 that are stored in models store 140, and may include a framework with which to execute the models. Using this approach, model developer 100 is not required to compile the models and, therefore, not required to test compiled models before deployment. Processing ends at 580.

Figure 6:
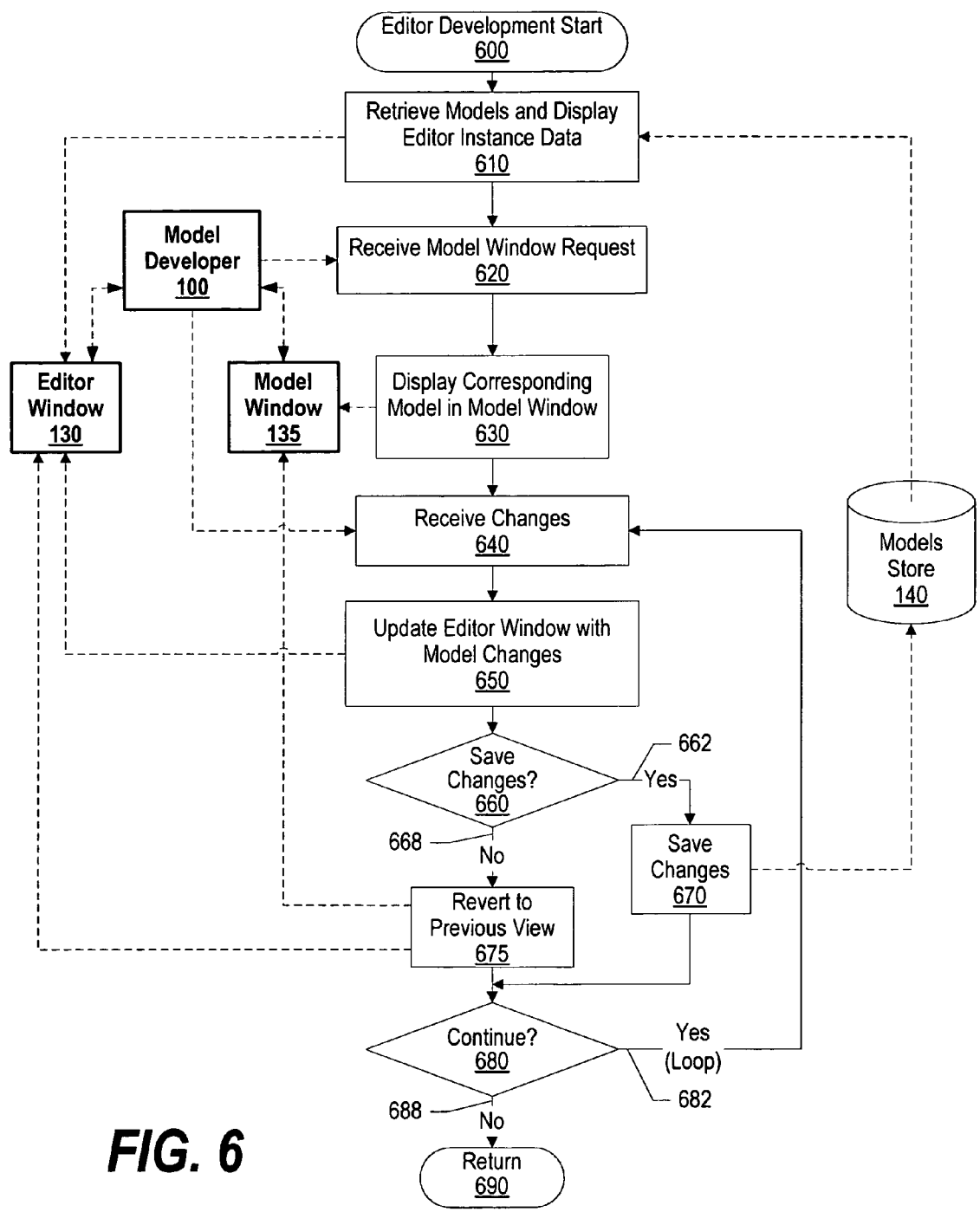
FIG. 6 is a flowchart showing steps taken in developing a model-driven editor.

FIG. 6 is a flowchart showing steps taken in developing a model-driven editor. Model developer 100 uses a framework, such as the Eclipse Modeling Framework, to generate models that produce instance data that represents a model-driven editor. Model developer 100 uses model window 135 to view model data, and uses editor window 130 to view instance data that corresponds to the model data (see FIG. 2 and corresponding text for further details regarding model data and instance data viewing). The models and framework are then deployed to an end user, whereby the end user uses the model-driven editor to create applications. Model developer 100, editor window 130, and model window 135 are the same as that shown in FIG. 1.

Processing commences at 600, whereupon processing retrieves models from model store 140 and displays corresponding instance data on editor window 130 (step 610). Models store 140 is the same as that shown in FIG. 1. At step 620, processing receives a model window request from model developer 100. For example, model developer 100 may wish to view model window 135 in order to modify, add, or delete models whose instance data is displayed on editor window 130.

Processing opens model window 135, and displays model data in window 135 (step 630). At step 640, processing receives model changes from model developer 100, such as modifying an existing model, deleting a model, or adding a model. Processing, at step 650, updates the instance data in editor window 130 based upon model developer 100's changes.

A determination is made as to whether model developer 100 wishes to save the recent changes (decision 660). For example, model developer 100 may add a model to improve the "user friendliness" of the editor and, in this example, a determination is made as to whether model developer 100 wishes to save the new model.

If model developer 100 wishes to save the recent changes, decision 660 branches to "Yes" branch 662 whereupon processing saves the changes in models store 140 at step 670. On the other hand, if model developer 100 does not wish to save the changes, decision 660 branches to "No" branch 668 whereupon processing reverts back to the previous views on editor window 130 and model window 135.

A determination is made as to whether model developer 100 wishes to continue model modifications (decision 680). If model developer 100 wishes to continue, decision 680 branches to "Yes" branch 682 which loops back to receive and process more changes. This looping continues until model developer 100 wishes to stop model modifications, at which point decision 680 branches to "No" branch 688 whereupon processing returns at 690.

Figure 7:
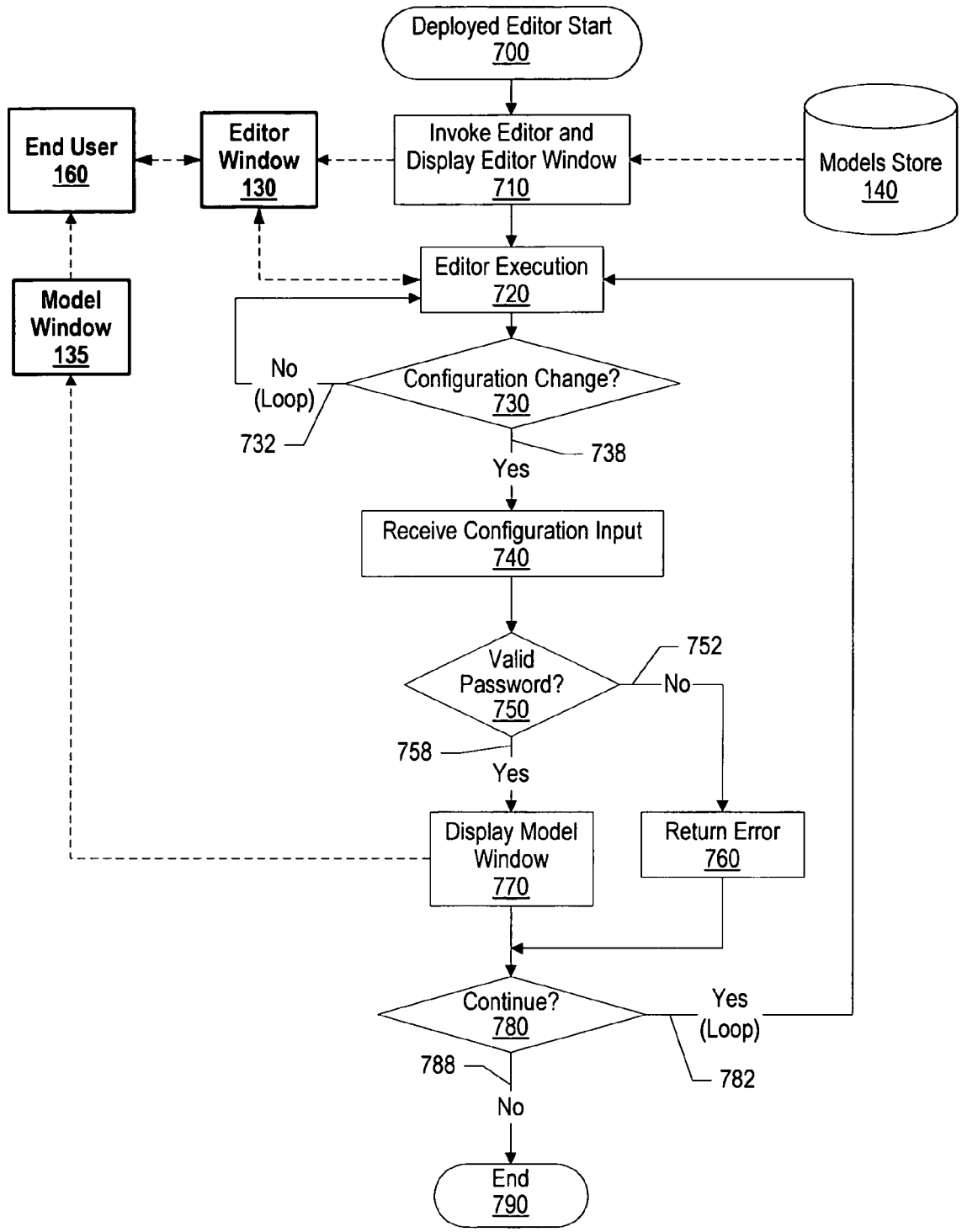
FIG. 7 is a flowchart showing steps taken in an end user operating a deployed model-driven editor.

FIG. 7 is a flowchart showing steps taken in an end user operating a model-driven editor. End-user 160 receives a model-driven editor from a developer. The model-driven editor includes a framework and models that produces the model-driven editor. End user 160 is the same as that shown in FIG. 1.

Processing commences at 700, whereupon processing retrieves models from models store 140, and displays corresponding instance data on editor window 130 for end user 160 to view (step 710). Editor window 130 and models store 140 are the same as that shown in FIG. 1. At step 720, processing executes the editor and receives various commands from end user 160 through editor window 130.

A determination is made as to whether end user 160 wishes to change the model-driven editor's configuration (decision 730). Particularly, processing determines whether end user 160 wishes to view model data that drives editor window 130. For example, processing may display a configuration window, such as that shown in FIG. 4B, to receive end user 160's input. If end user does not wish to view model data that drives editor window 130, decision 730 branches to "No" branch 732, which loops back to continue to execute the model-driven editor. This looping continues until end user 160 wishes to view model data that drives editor window 130, at which point decision 730 branches to "Yes" branch 738.

At step 740, processing receives configuration change input from end user 160. A determination is made as to whether end user 160 entered a valid password (decision 750). In one embodiment, a developer may set the password. In another embodiment, processing authenticates the user by other means, such as matching the user's identifier against a set of permissions.

If end user 160 provides the correct password, decision 750 branches to "Yes" branch 758 whereupon processing displays model window 135 at step 770. In turn, model window 135 displays model data for end user 160 to view. On the other hand, if end user 160 does not provide the correct password, decision 750 branches to "No" branch 752 whereupon processing returns an error to end user 160 at step 760. Model window 135 is the same as that shown in FIG. 1.

A determination is made as to whether end user 160 wishes to continue using the model-driven editor (decision 780). If end user 160 wishes to continue using the model-driven editor, decision 780 branches to "Yes" branch 782 whereupon processing continues editor execution. This looping continues until end user 160 wishes to terminate the model-driven editor, at which point decision 780 branches to "No" branch 788 whereupon processing ends at 790.

Figure 8:
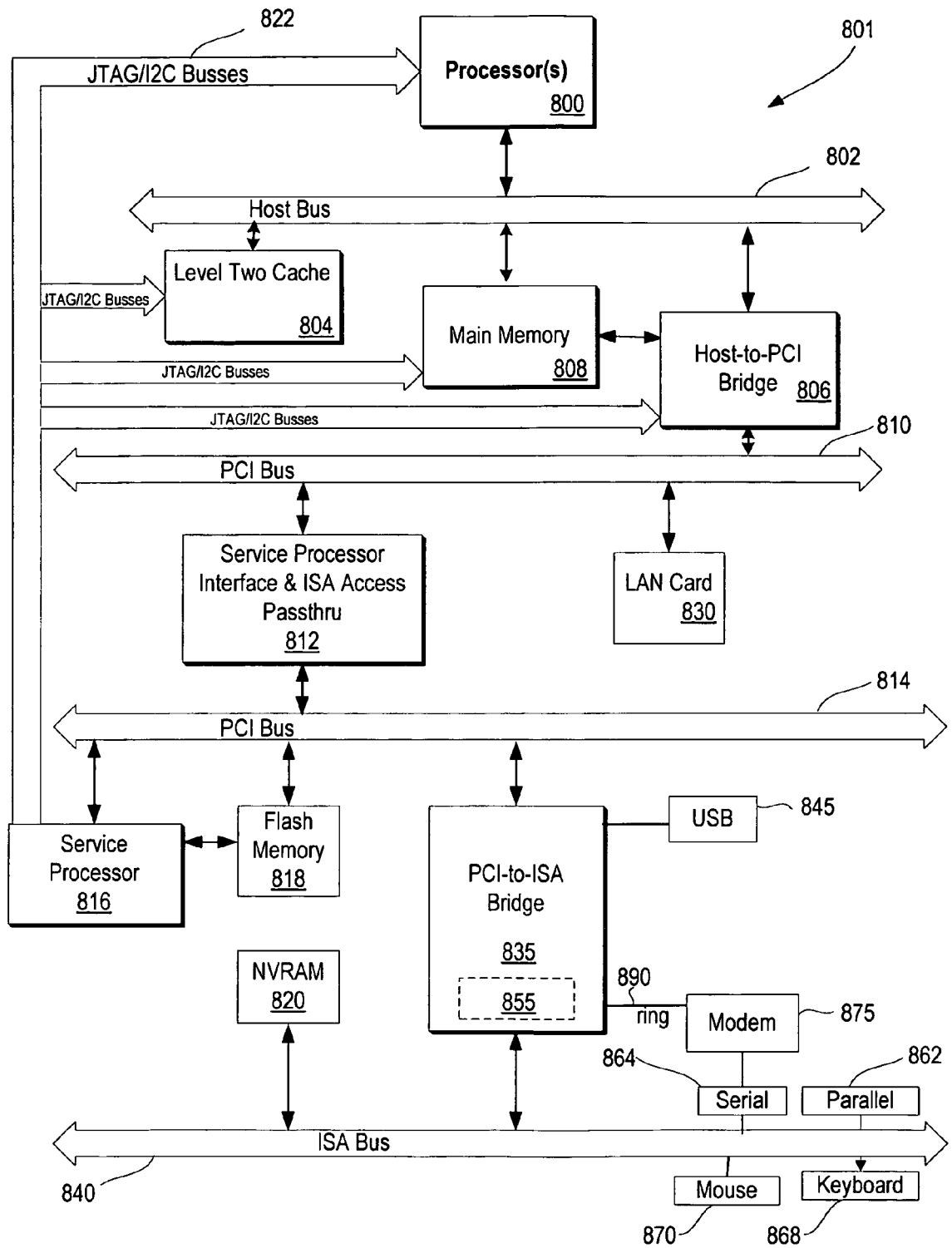
FIG. 8 is a block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 885 is connected to serial port 864 and PCI-to-ISA Bridge 835.

While FIG. 8 shows one information handling system that employs processor(s) 800, the information handling system may take many forms. For example, information handling system 801 may take the form of a desktop, server, portable, laptop, notebook, or other form factor computer or data processing system. Information handling system 801 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   generating, on a development framework, instance data using a model;
   producing, by the development framework, a model-driven editor using the instance data;
   displaying, by the development framework, both the model and the model-driven editor on a display;
   after displaying both the model and the model-driven editor, receiving a request to deploy the model-driven editor to an end user computer system;
   inhibiting accessibility, by the development framework, to the model in response to the request to deploy the model-driven editor to an end user computer system;
   deploying, from the development framework, the model and the model-driven editor to the end user computer system, wherein the model-driven editor is adapted to be displayed at the end user computer system and the model is inaccessible at the end user computer system; and
   deploying, from the development framework, an updated model and updated instance data to the end user computer system, wherein the model-driven editor is adapted to display the updated instance data at the end user computer system.

2. The method of claim 1 wherein the model is displayed in a model window and the instance data is displayed on an editor window, and the inhibiting results in inhibiting the model window.

3. The method of claim 2 further comprising:
   receiving model changes prior to the deploying; and
   updating, without restarting, the editor window with updated instance data based upon the model changes.

4. The method of claim 1 further comprising:
   receiving an end user configuration request from an end user;
   determining whether the end user is authorized to view the model in response to receiving the end user configuration request; and
   displaying the model to the end user based upon the determination.

5. The method of claim 1 wherein the deploying does not require code compilation.

6. The method of claim 1 further comprising:
   wherein the model-driven editor is adapted to support mixed-content documents; and
   wherein the method is performed on an Eclipse Modeling Framework.

7. A computer program product stored on a computer readable storage medium, the computer readable storage medium containing instructions for execution by a computer, which, when executed by the computer, cause the computer to implement a method for developing and deploying a model-driven editor, the method comprising:
   generating, on a development framework, instance data using a model;
   producing, by the development framework, a model-driven editor using the instance data;
   displaying, by the development framework, both the model and the model-driven editor on a display;
   after displaying both the model and the model-driven editor, receiving a request to deploy the model-driven editor to an end user computer system;
   inhibiting accessibility, by the development framework, to the model in response to the request to deploy the model-driven editor to an end user computer system;
   deploying, from the development framework, the model and the model-driven editor to the end user computer system, wherein the model-driven editor is adapted to be displayed at the end user computer system and the model is inaccessible at the end user computer system; and
   deploying, from the development framework, an updated model and updated instance data to the end user computer system, wherein the model-driven editor is adapted to display the updated instance data at the end user computer system.

8. The computer program product of claim 7 wherein the model is displayed in a model window and the instance data is displayed on an editor window, and the inhibiting results in inhibiting the model window.

9. The computer program product of claim 8 wherein the method further comprises:
   receiving model changes prior to the deploying; and
   updating, without restarting, the editor window with updated instance data based upon the model changes.

10. The computer program product of claim 7 wherein the method further comprises:
    receiving an end user configuration request from an end user;
    determining whether the end user is authorized to view the model in response to receiving the end user configuration request; and
    displaying the model to the end user based upon the determination.

11. The computer program product of claim 7 wherein the deploying does not require code compilation.

12. The computer program product of claim 7 further comprising:
wherein the model-driven editor is adapted to support mixed-content documents; and
wherein the method is performed on an Eclipse Modeling Framework.

13. An information handling system comprising:
one or more displays;
one or more processors;
a memory accessible by the processors;
one or more nonvolatile storage devices accessible by the processors; and
an editor generation tool for developing and deploying a model-driven editor, the editor generation tool being effective to:
generate instance data using a model;
produce a model-driven editor using the instance data;
display both the model and the model-driven editor on a display;
after displaying both the model and the model-driven editor, receive a request to deploy the model-driven editor to an end user computer system;
inhibit accessibility to the model in response to the request to deploy the model-driven editor to an end user computer system;
deploy the model and the model-driven editor disabling to the end user computer system, wherein the model-driven editor is adapted to be displayed at the end user computer system and the model is at the end user computer system; and
deploying, from the development framework, an updated model and updated instance data to the end user computer system, wherein the model-driven editor is adapted to display the updated instance data at the end user computer system.

14. The information handling system of claim 13 wherein the model is displayed in a model window on one of the displays and the instance data is displayed in an editor window on one of the displays, and the inhibiting results in inhibiting the model window.

15. The information handling system of claim 14 wherein the editor generation tool is further effective to:
receive model changes prior to the deploying; and
update, without restarting, the editor window with updated instance data based upon the model changes.

16. The information handling system of claim 13 wherein the editor generation tool is further effective to:
receive an end user configuration request from an end user;
determine whether the end user is authorized to view the model in response to receiving the end user configuration request; and
display the model on one of the displays to the end user based upon the determination.

17. The information handling system of claim 13 wherein the deploying does not require code compilation.

* * * * *